(12) United States Patent
Rai

(10) Patent No.: US 6,529,036 B1
(45) Date of Patent: Mar. 4, 2003

(54) LOW NOISE, REDUCED SWING DIFFERENTIAL OUTPUT BUFFER DESIGN

(75) Inventor: Hariom Rai, Benson Town (IN)

(73) Assignee: Cypress Semiconductor Corp., San Jose, CA (US)

(*) Notice: Subject to any disclaimer, the term of this patent is extended or adjusted under 35 U.S.C. 154(b) by 0 days.

(21) Appl. No.: 09/742,758

(22) Filed: Dec. 20, 2000

(51) Int. Cl.[7] .......................... H03K 17/16; H03K 17/14
(52) U.S. Cl. .............................. 326/30; 326/32; 327/83; 327/378
(58) Field of Search ............................ 326/30, 31, 32, 326/34, 83, 86; 327/83, 108, 563, 378, 513

(56) References Cited

U.S. PATENT DOCUMENTS

| | | | | |
|---|---|---|---|---|
| 5,374,861 A | * | 12/1994 | Kubista | 326/30 |
| 5,519,353 A | * | 5/1996 | Rainal | 327/379 |
| 6,025,742 A | * | 2/2000 | Chan | 327/108 |
| 6,204,692 B1 | * | 3/2001 | Nakagawa | 326/83 |
| 6,414,512 B1 | * | 7/2002 | Moyer | 326/30 |

FOREIGN PATENT DOCUMENTS

JP   404108216 A   *   4/1992   .................. 326/30

OTHER PUBLICATIONS

"Gigabit–per–Second, ECL–Compatible I/O Interface in 0.35–$\mu$m CMOS", By Hormoz Djahanshahi et al., IEEE Journal of Solid State Circuits, vol. 34, No. 8, Aug. 1999, pp. 1074–1083.

* cited by examiner

Primary Examiner—Daniel D. Chang
(74) Attorney, Agent, or Firm—Christopher P. Maiorana, P.C.

(57) ABSTRACT

A circuit configured to match an impedance of a first pin and a second pin coupled to a transmission line. A first resistor is generally coupled to the first pin and a second resistor is generally coupled to the second pin. The first and second resistors may be coupled to a common node to provide an output voltage level independent of process corner and temperature variation.

17 Claims, 4 Drawing Sheets

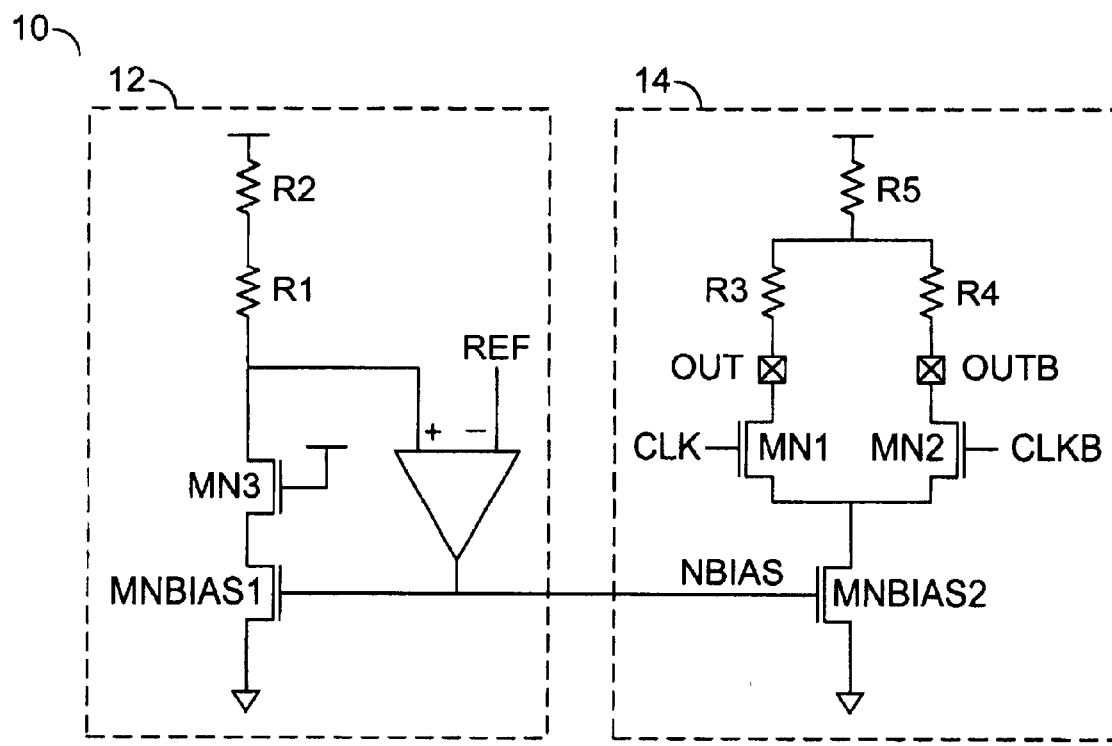
FIG. 1
(CONVENTIONAL)

LOW NOISE, REDUCED SWING DIFFERENTIAL OUTPUT BUFFER DESIGN

FIELD OF THE INVENTION

The present invention relates to a method and/or architecture for implementing buffers generally and, more particularly, to a method and/or architecture for implementing differential, reduced swing buffers.

BACKGROUND OF THE INVENTION

Referring to FIG. 1, a conventional reduced swing buffer 10 is shown. Reduced swing buffers are typically implemented in serial data communication and high speed data transfer applications. The buffer 10 implements current steering utilizing a scaled replica biasing scheme. The conventional reduced swing buffer 10 comprises a negative bias circuit 12 and a driver circuit 14. The bias circuit 12 implements a resistor R1 and a resistor R2. The driver circuit 14 implements a resistor R3, a resistor R4 and a resistor R5. The resistors R1, R2, R3, R4 and R5 are external resistors. The external resistors R1, R2, R3, R4 and R5 require the circuit 10 to implement additional external components. The resistors R1–R5 are required since a customer needs to configure (i.e., add) a proper resistance to the circuit 10. The circuit 10 is resistance matched at a load end and not at the source end. The bias circuit 12 implements a minimum negative bias transistor MNBIAS1 in a saturated region. The driver circuit 14 implements a minimum negative bias transistor MNBIAS2 in a saturation region. The saturated transistors MNBIAS1 and MNBIAS2 require additional pins to receive the negative bias signal NBIAS. Additionally, the driver circuit 14 cannot implement a resistor across a true output (i.e., OUT) and a complement output (i.e., OUTb).

SUMMARY OF THE INVENTION

The present invention concerns a circuit configured to match an impedance of a first pin and a second pin coupled to a transmission line. A first resistor is generally coupled to the first pin and a second resistor is generally coupled to the second pin. The first and second resistors may be coupled to a common node to provide an output voltage level independent of process corner and temperature variation.

The objects, features and advantages of the present invention include providing a method and/or architecture for a differential reduced swing buffer that may (i) allow high and low output levels to remain constant across process corner and temperature, (ii) represent matched impedance of a transmission line, (iii) have an output swing less sensitive to variation in a particular load resistor value, (iv) not require any external pins to implement a replica circuit, and/or (v) have less switching noise (Ldi/dt) because of current steering.

BRIEF DESCRIPTION OF THE DRAWINGS

These and other objects, features and advantages of the present invention will be apparent from the following detailed description and the appended claims and drawings in which:

FIG. 1 is a block diagram of a conventional differential buffer;

DETAILED DESCRIPTION OF THE PREFERRED EMBODIMENTS

With ever increasing clock frequencies and integration levels of CMOS circuits, input/output and interconnect issues are becoming a growing concern because of high frequencies that have faster edge rates and low power dissipation. Additionally, increasing bit rates, power dissipation and edge transition rates associated with full swing interconnect signals are becoming difficult to handle because of high power dissipation and slower edge rates. However, low swing signaling improves speed (e.g., performance) along with lower power dissipation of a device.

Figure 2:
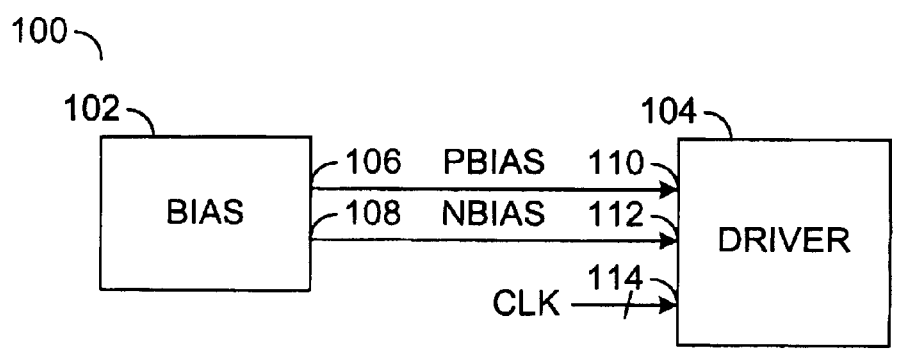
FIG. 2 is a block diagram of a preferred embodiment of the present invention.

Referring to FIG. 2, a block diagram of a circuit 100 is shown in accordance with a preferred embodiment of the present invention. The circuit 100 may be implemented as a differential, reduced (e.g., low) swing buffer. The swing may be a voltage difference between output pins (e.g., the difference between a voltage output high level VOH and a voltage output low level VOL). Specifically, reduced swing may be less than Vpower–Vground. The circuit 100 may generate voltage levels that may be independent of process corner and temperature variations. The circuit 100 may provide a driver circuit that may match impedance of a transmission line and allow a swing of the circuit 100 to have reduced sensitivity to variations in a load resistor. Additionally, the differential reduced swing buffer 100 may provide an improved driver circuit architecture.

The circuit 100 generally comprises a bias section (or circuit) 102 and a driver section (or circuit) 104. The bias section 104 may have an output 106 that may present a signal (e.g., PBIAS) and an output 108 that may present a signal (e.g., NBIAS). In one example, the signal PBIAS may be implemented as a positive bias signal and the signal NBIAS may be implemented as a negative bias signal. A bias signal may have a voltage that may vary across process corner or temperature variations in order to allow an output to remain constant across process corner or temperature variations. However, the signal PBIAS and the signal NBIAS may be implemented as other appropriate type signals in order to meet the criteria of a particular implementation. The driver section 104 may have an input 110 that may receive the signal PBIAS, an input 112 that may receive the signal NBIAS, an input 114 that may receive two differential clock signals (e.g., CLK and CLKb).

Figure 3:
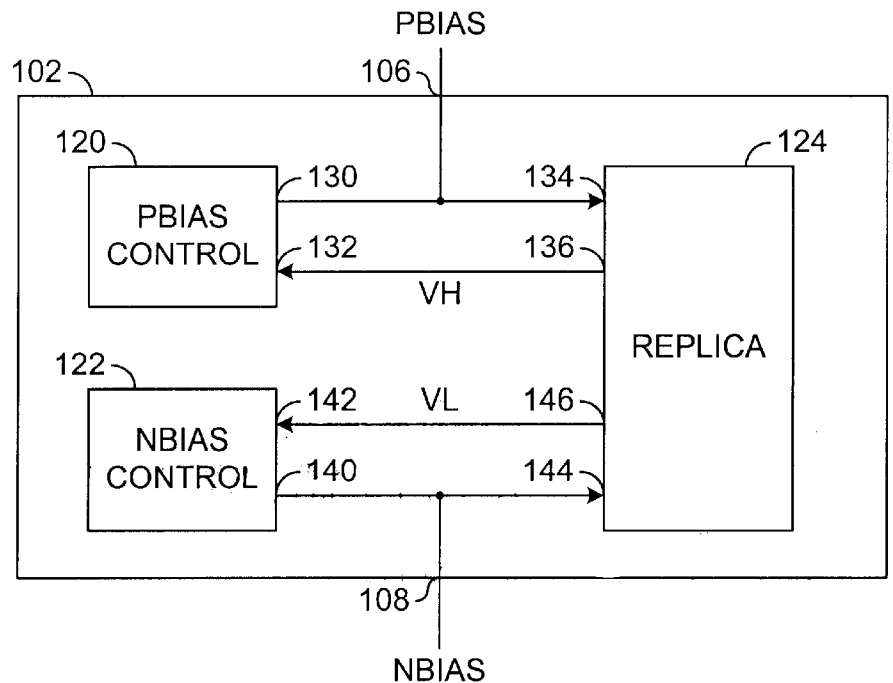
FIG. 3 is a block diagram of the bias section of a preferred embodiment of the present invention.

Referring to FIG. 3, a block diagram of the bias section 102 is shown. The bias section 102 generally comprises a control block (or circuit) 120, a control block (or circuit) 122 and a replica block (or circuit) 124. The control circuit 120 may be implemented, in one example, as an PBIAS control circuit. The control circuit 122 may be implemented, in one example, as an NBIAS control circuit. Alternatively, control circuit 120 and the control circuit 122 may be implemented as a single device.

The PBIAS control circuit 120 may have an output 130 that may present the signal PBIAS and an input 132 that may receive a signal (e.g., VH). The signal PBIAS may be presented to the output 106 as well as to an input 134 of the replica block 124. The replica block 124 may have an output that may present the signal VH. The control circuit 122 may have an output 140 that may present the signal NBIAS and an input 142 that may receive a signal (e.g., VL). The signal NBIAS may be presented to the output 108 as well as to an input 144 of the replica block 124. The replica block 124 may have an output 146 that may present the signal VL. The signals VH and VL may be implemented as a high voltage signal (e.g., VOH of a differential buffer) and a low voltage signal (e.g., VOL of a differential buffer), respectively. Additionally, a particular voltage level of the signals VH and VL may vary dependent upon a particular implementation. However, the signal VH and the signal VL may be implemented as a voltage level, a voltage on a node, or other appropriate type signal in order to meet the criteria of a particular implementation.

Figure 4:
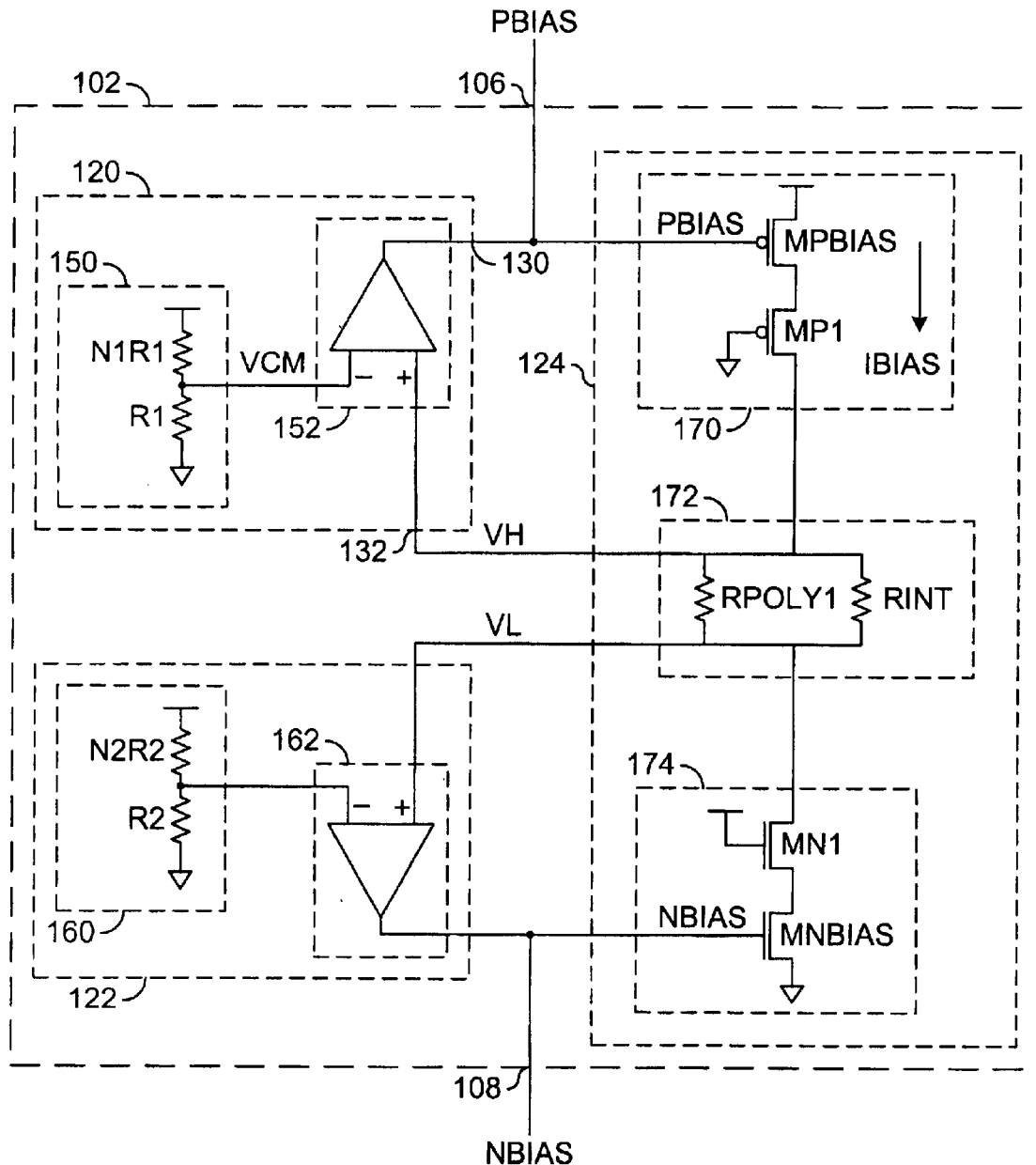
FIG. 4 is a detailed block diagram of the bias section of FIGS. 2 and 3.

Referring to FIG. 4, a detailed diagram of the bias circuit 102 is shown. The control circuit 120 generally comprises a resistor portion (or section) 150 and a summing portion (or section) 152. The section 150 generally comprises the resistor N1R1 and a resistor R1. A first side of the resistor N1R1 may be coupled to the power supply. A second side of the resistor N1R1 may be coupled to a first side of the resistor R1. A second side of the resistor R1 may be coupled to ground. The summing portion 152 generally comprises a comparator. A negative input of the comparator may be coupled between the resistor N1R1 and the resistor R1. A positive input of the comparator may receive the signal VH. An output of the comparator may be configured to generate the signal PBIAS. However, the comparator or appropriate type circuit may be implemented to compare the inputs and generate the signal PBIAS.

The control circuit 122 generally comprises a resistance portion (or section) 160 and a summing portion (or section) 162. The section 160 generally comprises a resistor N2R2 and a resistor R2. A first side of the resistor N2R2 may be coupled to the power supply. A second side of the resistor N2R2 may be coupled to a first side of the resistor R2. A second side of the resistor R2 may be coupled to ground. The summing portion 162 generally comprises a comparator. A negative input of the comparator may be coupled between the resistor N2R2 and the resistor R2. A positive input of the comparator may receive the signal VL. An output of the comparator may be configured to generate the signal NBIAS based on a comparison of the inputs.

The comparators of the summing sections 152 and 162 may provide a high gain amplifier. In a preferred implementation, the comparators of the section 152 and the section 162 may be implemented as operational transconductance amplifiers. The output voltage of the resistor network (the section 150) remains constant across process corner and temperature variation. Because of the high gain of the operational transconductance amplifiers of section 152 and 162, the voltage VH and VL may also remain constant over process corner and temperature variation.

The circuit 124 generally comprises a section 170, a section 172 and a section 174. The section 170 generally comprises a transistor MPBIAS and a transistor MP1. The transistors MPBIAS and MP1 may be implemented as PMOS transistors. An inverted gate of the transistor MPBIAS may receive the signal PBIAS, a source of the transistor MPBIAS may be coupled to the power supply and a drain of the transistor MPBIAS may be coupled to a source of the transistor MP1. A current (e.g., IBIAS) may traverse the MPBIAS transistor. An inverted gate of the transistor MP1 may be coupled to ground and a drain of the transistor MP1 may be coupled to the node VH.

The section 172 generally comprises a resistor (e.g., RPOLY1) and a resistor (e.g., RINT). The resistor RPOLY1 should be equal to the resistors R1_0+R2_0 (to be described in connection with FIG. 6). The resistor RINT is an internal resistor having a value equal to the load resistor RL connected between the output pairs (OUT and OUTb). A first side of the resistor RPOLY1 may be coupled to the node VH and a second side of the resistor RPOLY1 may be coupled to the node VL. A first side of the resistor RINT may be coupled to the node VH and a second side of the resistor RINT may be coupled to the node VL.

The section 174 generally comprises a transistor MN1 and a transistor MNBIAS. The transistors MN1 and MNBIAS may be implemented as NMOS transistors. A gate of the transistor MN1 may be coupled to the power source, a source of the transistor MN1 may be coupled to the node VL and a drain of the transistor MN1 may be coupled to a source of the transistor MNBIAS. A gate of the transistor MNBIAS may receive the signal NBIAS and a drain of the transistor MNBIAS may be coupled to ground.

The bias circuit 102 may set the signal PBIAS and the signal NBIAS such that the current IBIAS may remain constant (e.g., the transistors MPBIAS and MNBIAS are in the saturation region). By mirroring a driver circuit (to be described in more detail in connection with FIG. 6) one may ensure that the current IOUT also remains constant across process corner and temperature.

Figure 5:
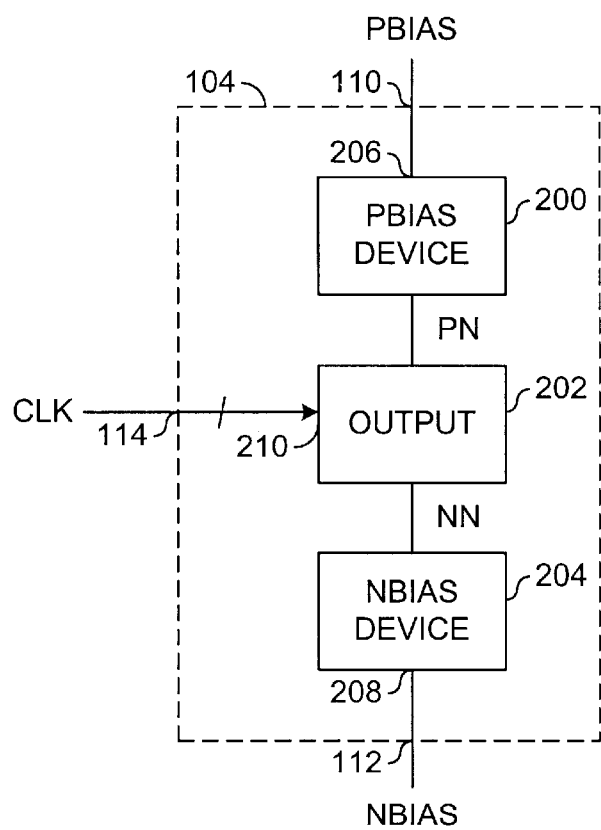
FIG. 5 is a block diagram of the driver section of a preferred embodiment of the present invention.

Referring to FIG. 5, a block diagram of the driver circuit 104 is shown. The driver circuit 104 may be implemented, in one example, as an output driver circuit. The driver circuit 104 generally comprises a section 200, a section 202 and a section 204. The section 200 may be implemented, in one example, as a PBIAS device (to be described in more detail in connection with FIG. 6). The section 204 may be implemented as an NBIAS device (to be described in more detail in connection with FIG. 6).

The PBIAS device 200 may have an input 206 that may receive the signal PBIAS. The NBIAS device 204 may have an input 208 that may receive the signal NBIAS. The PBIAS device 200 may present a signal (e.g., PN) to the output circuit 202. The NBIAS device 204 may present a signal (e.g., NN) to the output circuit 202. In one example, the signal PN may be implemented as a positive voltage. In another example, the signal NN may be implemented as a negative voltage. However, the signals PN and NN may be implemented as a voltage level, a voltage on a node, or another appropriate type signal in order to meet the criteria of a particular implementation. Additionally, the output section 202 may have an input 210 that may receive the signal CLK.

Figure 6:
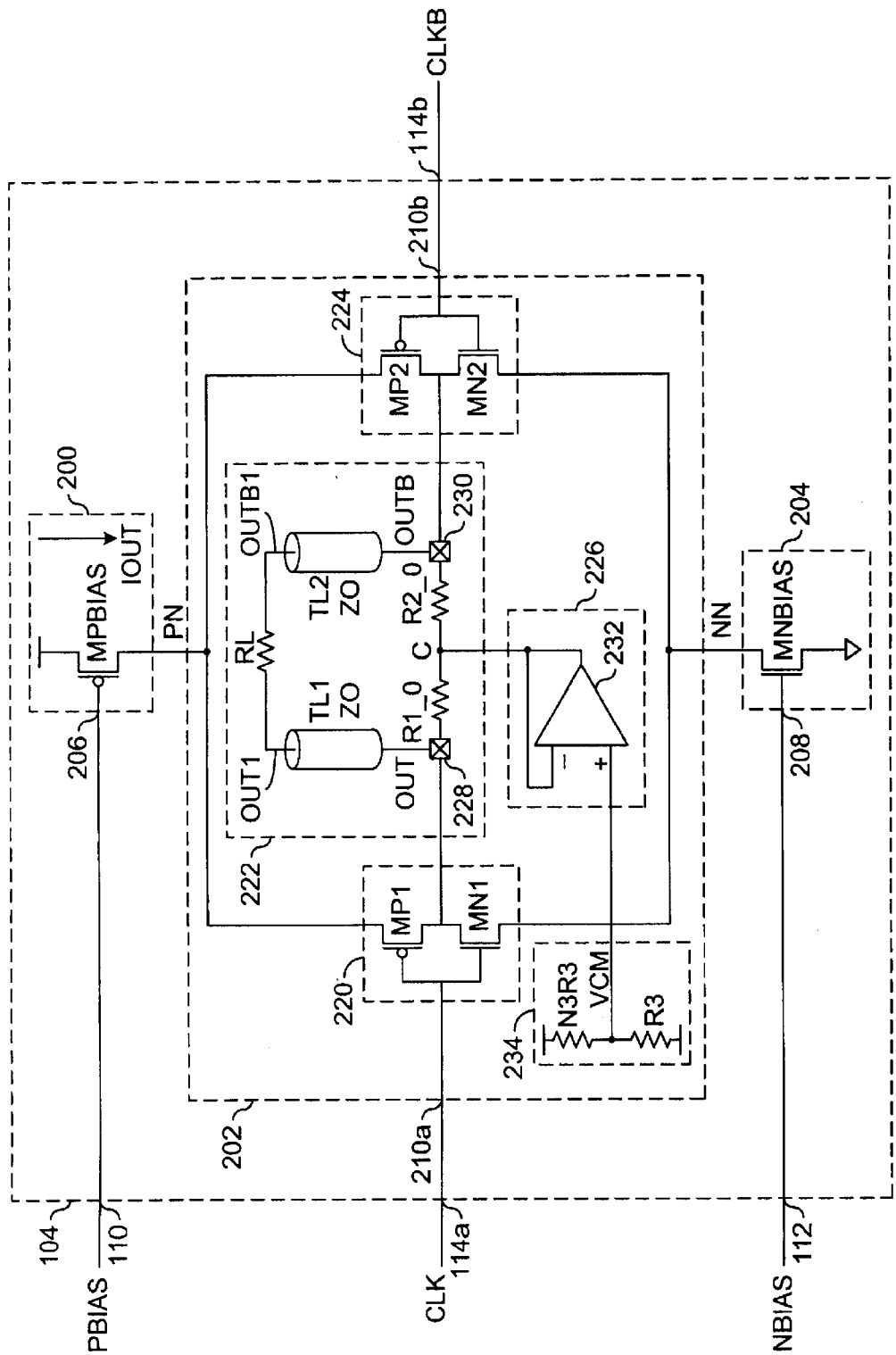
FIG. 6 is a detailed block diagram of the driver section of FIGS. 2 and 5.

Referring to FIG. 6, a detailed diagram of the driver circuit 104 is shown. The section 200 generally comprises a transistor (e.g., MPBIAS). The transistor MPBIAS may be implemented as a PMOS transistor. A gate of the transistor MPBIAS may receive the signal PBIAS, a source of the transistor MPBIAS may be coupled to the power supply and a drain of the transistor MPBIAS may be coupled to the node PN. A current (e.g., IOUT) may traverse the MPBIAS transistor.

The section 204 generally comprises a transistor (e.g., MNBIAS). The transistor MNBIAS may be implemented as an NMOS transistor. A gate of the transistor MNBIAS may receive the signal NBIAS, a source of the transistor MNBIAS may be coupled to the node NN and a drain of the transistor MNBIAS may be coupled to ground. The transistor MPBIAS and the transistor MNBIAS may be implemented in the saturated region.

The section 202 generally comprises a section 220, a section 222, a section 224, a section 226 and a section 234.

Additionally, the section 202 may receive the clock signal CLK at the input 114a and the clock signal CLKb at the input 114b. The section 220 may be coupled to the node PN and the node NN. The section 220 may comprise a transistor (e.g., MP1) and a transistor (e.g., MN1). The transistor MP1 may be implemented as a PMOS transistor. The transistor MN1 may be implemented as an NMOS transistor. An inverted gate of the transistor MP1 may receive the clock signal CLK, a source of the transistor MP1 may be coupled to the node PN and a drain of the transistor MP1 may be coupled to a node (e.g., OUT). A gate of the transistor MN1 may receive the signal CLK, a source of the transistor MN1 may be coupled to the node OUT and a drain of the transistor MN1 may be coupled to the node NN.

The section 224 may be coupled to the node PN and the node NN. The section 224 may comprise a transistor (e.g., MP2) and a transistor (e.g., MN2). The transistor MP2 may be implemented as a PMOS transistor. The transistor MN2 may be implemented as an NMOS transistor. A gate of the transistor MP2 may receive the clock signal CLKb, a source of the transistor MP2 may be coupled to the node PN and a drain of the transistor MP2 may be coupled to a node (e.g., OUTB). A gate of the transistor MN2 may receive the signal CLKb, a source of the transistor MN2 may be coupled to the node OUTB and a drain of the transistor MN2 may be coupled to the node NN.

The section 226 may be coupled to the section 222 and to the section 234. The section 226 generally comprises a voltage follower 232. A positive input of the voltage follower 232 may receive a signal (e.g., VCM from the section 234). A negative input of the voltage follower 232 may receive a feedback signal. An output of the voltage follower 232 is generally presented to the section 222 and to the negative input of the voltage follower 232. The negative feedback may ensure that the voltage at a node (e.g., C) will remain at VCM (across process corner and temperatures).

The section 234 generally comprises a resistor N3R3 and a resistor R3. A first side of the resistor N3R3 may be coupled to the power supply. A second side of the resistor N3R3 may be coupled to a first side of the resistor R3. A second side of the resistor R3 may be coupled to ground. The section 234 generates the signal VCM presented to the circuit 232. In one example, the signal VCM may be implemented as a voltage common mode signal. The signal VCM should be equal to the signal VOL+ [OUTPUTSWING/2], where VOL is the output low level and OUTPUTSWING is the difference between the output high level and output low level [VOH−VOL].

The section 222 generally comprise a pin (or output) 228 and a pin (or output) 230. The pin 228 may be coupled to the node OUT. Therefore, the pin 228 may be coupled to the drain of the transistor MP1 and the source of the transistor MN1. The pin 230 may be coupled to the node OUTB. Therefore, the pin 230 may be coupled to the drain of the transistor MP2 and the source of the transistor MN2. The node OUTB may represent a digital complement of the node OUT. The pin 228 (OUT) and the pin 230 (OUTb) may be coupled to the drain of the transistor MP2 and the source of the transistor MN2. The node OUTB may represent a digital complement of the node OUT. The pin 228 (OUT) and the pin 230 (OUTb) may be coupled by a first resistor (e.g., R1_0) and a second resistor (e.g., R2_0), as shown in section 222. The pin 228 and the pin 230 may be coupled by a first pin of the transmission lines TL1 and TL2. The resistors R_0 and R2_0 are internal resistors.

The node C may be coupled between the resistor R_0 and the resistor R2_0. The node C may be coupled to the output of the voltage follower 232. Additionally, a load resistor (e.g., RL) may be coupled to the second pins (e.g., OUT1 and OUTB1) of the transmission lines TL1 and TL2, respectively. The bias circuit 102 may set voltage levels at PBIAS and NBIAS such that the voltage levels of the signals OUT and OUTb of the circuit 104 remain constant across process corner and temperature variation.

The circuit 100 may be implemented such that the resistance looking into the terminal OUT or OUTb is equal to the characteristic impedance of the transmission lines TL1 and TL2 by appropriately choosing the value of the resistors R1_0 and R2_0. The bias circuit 102 may then set voltage levels of the signals PBIAS and NBIAS such that the voltage levels of the signals OUT and OUTb of the circuit 104 remain constant across process corner and temperature variation. A network load is assumed to be the resistor RL between the true OUT and complement OUTb outputs.

By mirroring the circuit IOUT, also remain constant. The high impedance nodes PN and NN (e.g., between power supply and ground) make it difficult to set a common mode voltage. The voltage follower 232 may set the signal VCM at the node C. Since the current IOUT remains constant, the voltage levels VOH and VOL also remain constant. One can calculate a value of the resistor R1_0 and the resistor R2_0 to match the impedance of transmission line. Since a part of swing is determined by R1_0/R2_0, the swing may have lesser sensitivity to variation in a load resistor value. Since the transistor MPBIAS and the transistor MNBIAS are in a saturation region, the current through the transistor MPBIAS and the transistor MNBIAS will remain constant even when the signals CLK and CLKb make transitions, thus Ldi/dt (e.g., switching noise) will be significantly reduced.

The circuit 104 may be a differential driver circuit. The driver 104 may receive clock signals (e.g., the clock signals CLK and CLKb) which may be 180 degree out of phase and generates outputs (e.g., the outputs OUT and OUTB) which may be reduced swing outputs. If the clock signal CLK is high, the clock signal CLKb may be low and a current path of the circuit 104 may transcend from a power supply through the transistor MPBIAS to the transistor MP2, the resistor(s) R1_0 and R2-2/RL, and then the transistor MN1 and the transistor MNBIAS. The driver circuit 104 may set the voltage level VOH on the output pin OUTB and the voltage level VOL on the output pin OUT. Because of symmetry with the bias circuit 102, the voltage levels VOL and VOH may not significantly vary across corner and temperature variations (due to the bias signals PBIAS and NBIAS which will vary across process corner and temperature to ensure that the signals OUT and OUTB remain constant).

Similarly, if the clock signal CLK is low, the clock signal CLKb may be high and the current path may transcend from the power supply through the transistor MPBIAS, the transistor MP1, the resistor(s) R1_0 and R2_0/RL, and then the transistor MN2 and the transistor MNBIAS. The driver circuit 104 may then set the voltage level VOH on the output pin OUT and the voltage level VOL on the output pin OUTB. The circuit 104 may allow the clock signals CLK and CLKb to switches between the power supply and ground. The circuit 104 may have output pins (e.g., the pins OUT and OUTB) which may switch between the voltage levels VOH and VOL.

Furthermore, the swing may not significantly vary if the resistance value of the resistor RL varies. For example, the swing may have a variation over the process corner and temperature of 30–40 mV. The circuit 100 may provide a method for matched transmission line impedance.

The bias circuit 102 may set the signal VH and the signal VL at levels equal to VOH (Voltage Output High) and VOL (Voltage Output Low), respectively. The circuit 100 may provide a low swing differential driver in a CMOS device. The circuit 100 may provide matched impedance to a transmission line (e.g., matching of the resistor looking into the nodes OUT or OUTB and the resistor RL). The circuit 100 may provide VOH and VOL levels that do not significantly vary across the process corner and temperature. The circuit 100 may have less sensitivity to variation in a load resistor value. The circuit 100 may produce levels which are independent of process corner and temperature variation. The circuit 100 may match impedance of a transmission line (e.g., matching of the resistor looking into the nodes OUT or OUTB and the resistor RL) and have reduced sensitivity to variation in the load resistor.

The present invention may allow high and low output levels (VOH and VOL) to remain constant across process corner and temperature. The present invention may represent matched impedance to transmission line. The present invention may have an output swing (e.g., VOH−VOL) less sensitive to variation of a particular load resistor value. Additionally, the present invention does not require any external pins to implement a replica circuit, which will have less switching noise Ldi/dt.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, a particular implementation of a PMOS and/or NMOS transistor may be adjusted in order to meet the criteria of a particular implementation. However, a particular polarity of the various PMOS/NMOS signals may need to be adjusted, respectively.

While the invention has been particularly shown and described with reference to the preferred embodiments thereof, it will be understood by those skilled in the art that various changes in form and details may be made without departing from the spirit and scope of the invention.

What is claimed is:

1. A circuit configured to match an impedance of a first pin and a second pin coupled to a transmission line comprising:
   a bias circuit comprising (i) a first comparator configured to generate a first signal and (ii) a second comparator configured to generate a negative bias signal; and
   a driver circuit (i) coupled to said first pin and said second pin and (ii) configured in response to said first signal and said negative bias signal, wherein a first resistor is coupled to said first pin, a second resistor is coupled to said second pin and said first and second resistors are coupled to a common node to provide an output voltage level independent of process corner and temperature variation.

2. The circuit according to claim 1, wherein said output voltage level comprises a first voltage level and a second voltage level.

3. The circuit according to claim 2, wherein said first voltage level comprises a voltage output high (VOH) level and said second voltage level comprises a voltage output low (VOL) level.

4. The circuit according to claim 3, wherein said VOH and VOL levels do not significantly vary across said process corner and temperature variation.

5. The circuit according to claim 1, wherein said circuit comprises a differential reduced swing circuit.

6. The circuit according to claim 1, wherein said circuit has a reduced sensitivity to variations in a load resistor value of said transmission line.

7. The circuit according to claim 1, wherein said circuit is configured to provide a low swing differential driver in a CMOS device.

8. The circuit according to claim 1, wherein said circuit is configured to reduce di/dt noise on said transmission line.

9. The circuit according to claim 1, wherein said driver circuit is further configured in response to a differential signal.

10. The circuit according to claim 1, wherein said first signal comprises a positive bias signal.

11. The circuit according to claim 1, wherein said first and second comparators comprise operational amplifiers.

12. The circuit according to claim 1, wherein the driver circuit is further configured to generate said output voltage level.

13. An apparatus comprising:
   means for generating a first signal in response to a first comparison;
   means for generating a negative bias signal in response to a second comparison; and
   means for matching an impedance of an output comprising a first pin and a second pin coupled to a transmission line, wherein (i) said means for matching is configured in response to said first signal and said negative signal and (ii) said first and second pins are coupled through first and second resistors of said means for matching to a common node to provide an output voltage level independent of process corner and temperature variation.

14. A method for controlling a buffer, comprising the steps of:
   (A) generating a first signal in response to a first comparison;
   (B) generating a negative bias signal in response to a second comparison; and
   (C) controlling said buffer to match an impedance of an output comprising a first pin and a second pin of a transmission line, wherein (i) said buffer is configured in response to said first signal and said negative bias signal and (ii) said first and second pins are coupled through first and second resistors of said buffer to a common node to provide an output voltage level independent of process corner and temperature variation.

15. The method according to claim 14, wherein said output voltage level comprises a first voltage level and a second voltage level.

16. The method according to claim 15, wherein said first voltage level comprises a voltage output high (VOH) level and said second voltage level comprises a voltage output low (VOL) level.

17. The method according to claim 16, wherein said VOH and VOL levels do not significantly vary across said processes corner and temperature variation.

* * * * *